No. 723,168. PATENTED MAR. 17, 1903.
H. LEMP.
PROPELLING MEANS FOR AUTOMOBILES.
APPLICATION FILED NOV. 2, 1900. RENEWED AUG. 16, 1901.
NO MODEL. 2 SHEETS—SHEET 1.

WITNESSES
Henry O. Westendarp.
A. F. Macdonald.

INVENTOR
Hermann Lemp,
by Albert G. Davis
Atty.

No. 723,168. PATENTED MAR. 17, 1903.
H. LEMP.
PROPELLING MEANS FOR AUTOMOBILES.
APPLICATION FILED NOV. 2, 1900. RENEWED AUG. 16, 1901.
NO MODEL. 2 SHEETS—SHEET 2.

Witnesses:
Lewis P. Abell
Benjamin B. Hull

Inventor.
Hermann Lemp,
by Albert G. Davis
Atty.

UNITED STATES PATENT OFFICE.

HERMANN LEMP, OF LYNN, MASSACHUSETTS, ASSIGNOR TO GENERAL ELECTRIC COMPANY, A CORPORATION OF NEW YORK.

PROPELLING MEANS FOR AUTOMOBILES.

SPECIFICATION forming part of Letters Patent No. 723,168, dated March 17, 1903.

Application filed November 2, 1900. Renewed August 16, 1901. Serial No. 72,320. (No model.)

*To all whom it may concern:*

Be it known that I, HERMANN LEMP, a citizen of the United States, residing at Lynn, county of Essex, State of Massachusetts, have invented certain new and useful Improvements in Propelling Means for Automobiles, (Case No. 1,012,) of which the following is a specification.

My invention relates to a novel form of motive power suitable for automobiles, and comprises an arrangement which is composite in character consisting of a prime mover of some sort the effective torque of which in propelling the vehicle is electrically controlled.

In the specific embodiment of my invention, which I have hereinafter described, I make use of a gas-engine which is geared to an electric generator and connected either directly or indirectly to one member of a differential gear, the opposing member of which is acted upon by a dynamo-electric machine the torque of which may be readily controlled, so as to drive the carriage or other vehicle either forward or backward with varying degrees of speed, the engine all the time working at full speed, and therefore under best conditions.

For a further understanding of the nature of my invention reference is to be had to the following description, taken in connection with the accompanying drawings.

The points of novelty which characterize my invention I have set forth in claims appended hereto.

Figure 1:
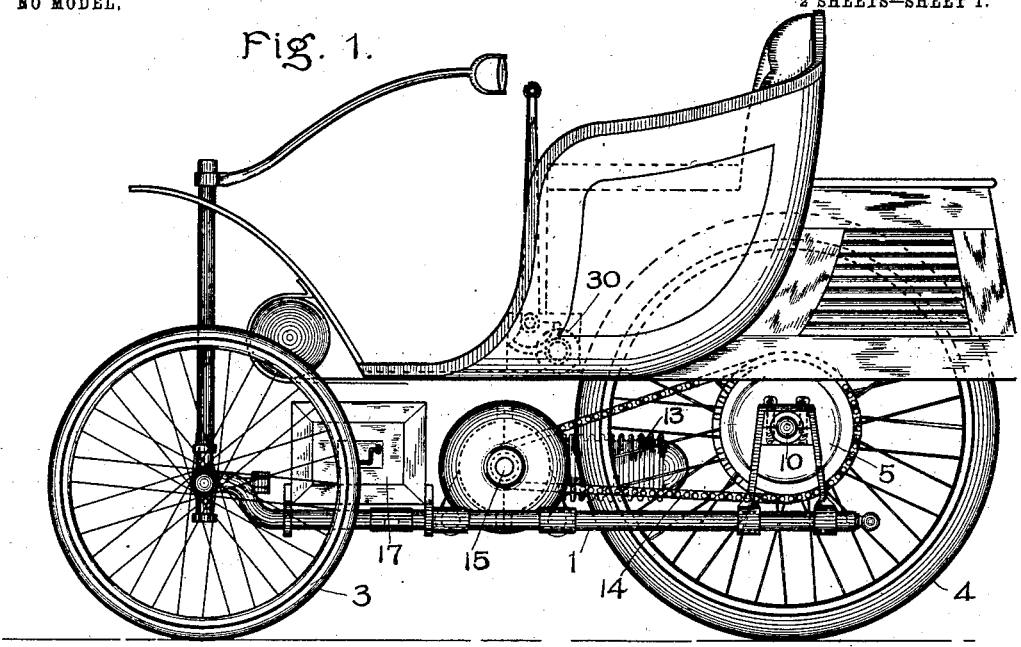
Figure 2:
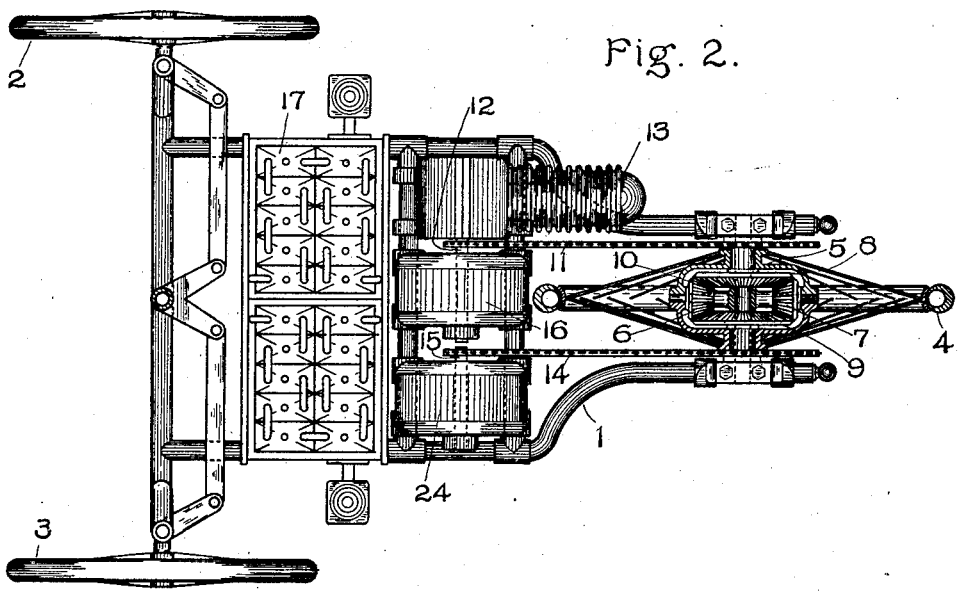
Figure 3:
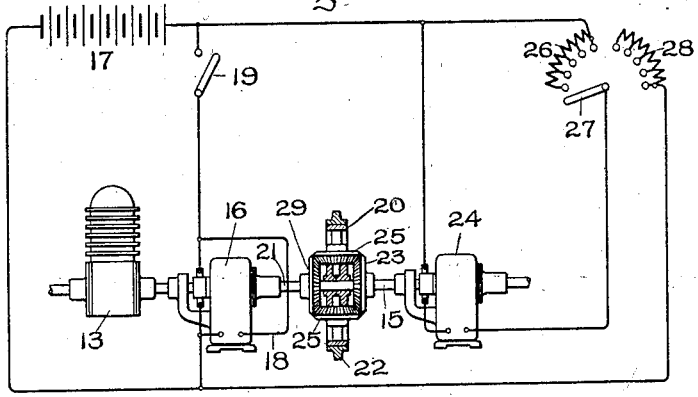
Figure 4:
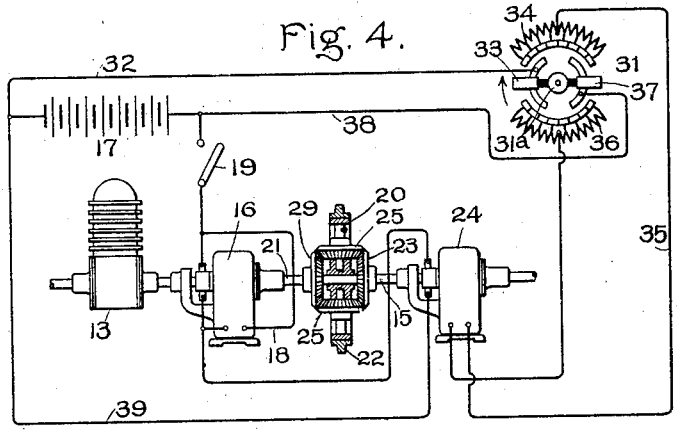

In the drawings, Figures 1 and 2 represent, respectively, a side elevation and plan of an automobile vehicle provided with composite driving mechanism of my invention. Figs. 3 and 4 are diagrams of circuits, these diagrams serving to explain more clearly the operation of the mechanism shown in Figs. 1 and 2.

In Figs. 1 and 2 the vehicle to which my new driving mechanism is applied consists of a three-wheeled structure having a framework 1 carried upon the two front wheels 2 3 and a single rear wheel 4. The hub 5 on the rear wheel constitutes the driving portion of a differential gear and carries the idle bevel-wheels 6 7, which rotate upon pins fixed thereto. The two main gears of the differential gearing are represented at 8 and 9. Each of these gears is sleeved upon the shaft 10 of the rear driving-wheel 4. Of these two gear-wheels the wheel 8 is connected by sprocket wheels and chain 11 to the shaft 12 of the gas-engine 13, which is mounted upon the frame 1 of the vehicle. In a similar manner the gear-wheel 9 of the differential gear is connected, through suitable sprocket wheels and chain 14, to the shaft 15 of a small direct-current dynamo-electric machine, the shaft of this machine being independent of the shaft of the gas-engine.

The motive apparatus is completed by a small direct-current generator 16, directly connected to the gas-engine 13. A storage battery, the function of which will be hereinafter described, is shown at 17.

Turning now to Fig. 3, which is a diagram representing the working of the apparatus shown in Figs. 1 and 2, it will be seen that the generator 16, which is directly connected to the gas-engine 13, is of the shunt-wound type, with its field-circuit indicated at 18. The terminals of the machine are adapted to be connected to the storage battery 17 by the switch 19, which may be manipulated at will. In starting up the apparatus this storage battery is intended to supply current to the generator 16, which thereby becomes a motor and serves to bring the gas-engine up to speed. The engine thereupon starts into operation in the usual manner and exerts a torque upon the machine 16, which thereupon becomes a generator and returns energy to the storage battery. In going up grades or under other circumstances where there is a large demand for driving torque the engine may slow down, in which case the battery returns energy to the machine 16, driving it as a motor, and thus helping out the engine. Under normal conditions, however, the driving torque for the vehicle is derived chiefly from the gas-engine 13 and is transmitted either indirectly or directly, as the case may be, to the member 29 of the differential gear. The diagram in Fig. 3 shows the shaft of the gas-engine directly connected to the differential gear by means of the shaft 21, this being a modification of the chain-and-sprocket connection shown in Figs. 1 and 2. The revolving or driving member of the differential gear (indicated in Fig. 3 at 20) is connected to the mechanism to be driven either directly, as shown in Figs. 1 and 2, or by means of a chain-and-sprocket connection, the sprocket connection being represented in Fig. 3 by a sprocket-wheel, (shown in section at 22.) The remaining differential gear 23 is shown as connected directly to a dynamo-electric machine 24, corresponding to the machine 24 in Fig. 2.

This machine is of the series-wound type and is provided with switching mechanism whereby its circuit may be closed on a variable resistance and with additional switch mechanism whereby it may be connected, preferably through a variable resistance, across the storage battery 17.

From the above description the operation of the driving mechanism may now be readily understood. In starting up the machine 16 is connected across the storage battery 17, thereby acting to start up the gas-engine. The switch 19 may then be opened, according to whether it is desired that the battery should remain in circuit with the machine 16. The gas-engine being in operation rotates the shaft 21 and transmits motion through the idler-gears 25 to the shaft 15 of the motor 24, this shaft being then rotated backward without doing any work. The motor under these circumstances is an open circuit and offers only the small resisting torque due to the friction of the bearings, &c., this small resisting torque being insufficient by its reaction to cause motion of the rotating member 20 of the differential gear. The gas-engine having now been started, the carriage may be put into motion by slowly short-circuiting the circuit of the motor 24 upon a variable resistance 26. A switch 27 may be used for this purpose, and as it gradually cuts out the resistance 26 the motor 24 accordingly approximates the condition of short circuit, during which period the resisting torque of the machine acting as a generator causes the shaft 15, connected to the gear 23, to slow up and the vehicle to start into motion through the resultant movement of the movable member 20 of the differential gear. When the resistance 26 is entirely cut out, the machine 24 is brought nearly to rest, at which time the vehicle moves forward at, we will say, half speed. If a faster motion of the vehicle is desired, switch 27 may be still further rotated, bringing into circuit the variable resistance 28, through the medium of which the machine 24 is connected across the terminals of the storage battery 17. The machine 24 is therefore slowly started up as a motor, its field and armature being connected, we will assume, so that it will have the same direction of rotation as the gas-engine 13. The gear 23 being thus rotated forward in the same direction as its coöperating gear 29, therefore contributes to the forward motion of the vehicle, which under these circumstances moves forward at or near full speed. If slower speed is desired, the speed of the machine 24 is controlled accordingly by manipulation of the switch 27, while if a backward motion of the vehicle is desired the direction of rotation of the machine 24 as a motor may be reversed by reversing the connection between its field and armature, as will readily be understood. I have not, however, deemed it necessary to show herein a reversing-switch for this purpose, as it will be obvious that in practice all of these connections may be made by a suitably-laid-out controller-cylinder having contacts coöperating in the usual manner with fixed contact-fingers, such a controller-cylinder being indicated in diagram in Fig. 1 at 30.

Fig. 4 shows a somewhat different utilization of the machine 24, the different component parts of the apparatus being, however, arranged relatively to each other upon the vehicle in the same manner as represented in previous figures. The machine 24 instead of being connected either upon short circuit or across the terminals of the storage battery 17 is connected with its armature in series with the armature of the generator 16 and its field separately excited from the battery 17 and acts either to raise or lower the voltage in the circuit of the machine 16, according to the direction in which its field is excited. In one case it acts as a generator, in the other as a motor, thereby operating upon the differential gear 20 to produce motion of the vehicle in substantially the same manner as that characteristic of the arrangement in Fig. 3.

In order to control the torque of the machine 24 when connected as shown in Fig. 4, I excite its field from the storage battery 17, the direction and degree of excitation being controlled by a combined rheostat and reversing-switch 31. As the parts are shown at 31 the field-terminals are on open circuit. When the rheostat-arm 31$^a$ is moved in the direction of the arrow, the circuit is completed from the battery-lead 32 through the movable contact 33 to the resistance 34, which the current traverses until it reaches one terminal of the field through the conductor 35, the circuit being completed, as will readily be seen, through the resistance 36 and movable contact 37 to the return conductor or lead 38.

Supposing the switch 31 to have been moved so as to cause the machine 24 to generate an electromotive force in the local circuit 39 in the same direction as that generated by the machine 16, the boosting effect of the machine 24 thereby causes the resultant electromotive force in the circuit 39 to be greater by a certain amount than that of the storage battery 17. The machine 24, as well as the machine 16, therefore acts as a generator to supply current to the storage battery 17. The resisting torque of the machine 24 as a generator therefore reacts upon the differential gear 20 to cause a forward motion of the vehicle.

If the field of the machine 24 be reversed, the voltage of the machine is likewise reversed and being in a direction opposite to that of the machine 16 cuts down the electromotive force in the circuit 39 until it becomes less than that of the battery 17. The machine 24 being then driven as a motor produces a forward rotation of its shaft, which acting upon the differential gear 20 increases the speed of a vehicle, as will readily be understood.

In case a backward movement of the vehicle is desired the rheostat 31 is adjusted so that the machine 24 is driven as a motor in the opposite direction at a suitable speed.

What I claim as new, and desire to secure by Letters Patent of the United States, is—

1. The combination of an internal-combustion engine, a dynamo-electric machine driven thereby, a storage battery connected to said dynamo-electric machine, a second dynamo-electric machine, and a differential gearing to which both dynamo-electric machines are connected.

2. In an automobile vehicle, the combination of a differential gear connected to a wheel thereof, an internal-combustion engine acting on one member of said differential gear, and a dynamo-electric machine acting on another member of said gear.

3. In an automobile vehicle, the combination of an internal-combustion engine running normally at full speed, a dynamo-electric machine geared thereto, means for causing said dynamo-electric machine to act as a generator, and separate means for causing the dynamo-electric machine to act as a motor.

4. The combination of an internal-combustion engine, a vehicle to be driven thereby, and electrically-controlled speed-changing gearing between said engine and the driving-wheels of said vehicle.

5. The combination of an internal-combustion engine, a dynamo-electric machine, a differential gear between said dynamo-electric machine and said engine, and means for closing the circuit of said machine upon a variable resistance.

6. The combination of an internal-combustion engine, a dynamo-electric machine, a differential gear between said dynamo-electric machine and said engine, and means for causing the dynamo-electric machine to exert a resisting torque.

7. The combination of an internal-combustion engine, a dynamo-electric machine, a differential gear between said dynamo-electric machine and said engine, and means for causing the dynamo-electric machine to act either as generator or motor.

8. The combination of a differential gear, an internal-combustion engine connected to one member of said gear, and a dynamo-electric machine to another member of said gear.

9. The combination of a differential gear, an internal-combustion engine connected to one member of said gear, a dynamo-electric machine to another member of said gear, and means for causing said dynamo-electric machine to exert torque.

10. The combination of a differential gear, an internal-combustion engine connected to one member of said gear, a dynamo-electric machine to another member of said gear, and means for causing said dynamo-electric machine to exert torque either as a generator or motor.

11. The combination of an internal-combustion engine, a differential gear having one member connected to said engine, and electrically-controlled means for acting on another member of said differential gear.

12. In a vehicle, the combination of a main driving-motor geared to a wheel or wheels of said vehicle, and energy-storing means for varying the speed of said vehicle relatively to said motor.

13. The combination of a prime mover, a vehicle to be driven by energy derived therefrom, gearing between said prime mover and wheels of said vehicle, and electrical means for changing the speed of said vehicle relatively to said prime mover without disconnecting said gearing.

14. The combination of a prime mover, gearing having one member connected to said prime mover, and an electrically-controlled torque-producing device connected to another member of said gearing.

15. The combination of a prime mover, a dynamo-electric machine driven thereby, a storage battery connected to said dynamo-electric machine, a second dynamo-electric machine, and gearing to which both dynamo-electric machines are connected.

16. The combination of a prime mover, a dynamo-electric machine mechanically connected thereto, a storage battery connected to said dynamo-electric machine, a second dynamo-electric machine also connected to said storage battery, and a gearing between said dynamo-electric machines.

17. The combination of a vehicle, a main driving-motor therefor, gearing between said driving-motor and wheels of said vehicle, and electrical means for changing the speed of said vehicle relatively to said motor without disconnecting said gearing.

In witness whereof I have hereunto set my hand this 30th day of October, 1900.

HERMANN LEMP.

Witnesses:
DUGALD MCKILLOP,
WILLIAM G. FISHER.